United States Patent Office 3,824,108
Patented July 16, 1974

3,824,108
PROCESS FOR THE MANUFACTURE OF LOW-DENSITY NITROCELLULOSE GRANULES
Ernst-Joachim Stoetzer and Heinrich Wassmuth, Stolzenau, and Andreas Abraham, Botenberg, Germany, assignors to Dynamit Nobel A.G., Troisdorf, Germany
No Drawing. Filed May 5, 1969, Ser. No. 823,535
Claims priority, application Germany, May 4, 1968, P 17 71 313.2
Int. Cl. C08b 21/12
U.S. Cl. 106—128
14 Claims

ABSTRACT OF THE DISCLOSURE

Process of preparing nitrocellulose granules having a bulk density of between 0.4 and 0.6 g./cm.$^3$ from a nitrocellulose lacquer prepared by stirring under water nitrocellulose, stabilizers, and a nitrocellulose solvent insoluble in the water, adding to the lacquer still being stirred a protective colloid and a water-soluble alkali metal or alkaline earth metal salt, thereafter reducing the stirring speed whereupon the lacquer breaks up into drop-like particles, further reducing the stirring speed so as to cause the particles of lacquer to flow together again, making a second addition of protective colloid and salt, then increasing the stirring speed causing the lacquer to break up and form the desired particles and thereafter distilling off the solvent.

---

This invention relates to a process of preparing nitrocellulose granules having low densities.

More particularly this invention relates to a process of preparing nitrocellulose granules having a bulk density of between 0.4 and 0.6 g./cm.$^3$.

Spherically shaped monobasic or polybasic nitrocellulose grains are generally manufactured by first working nitrocellulose with added stabilizers under water at a temperature between 60 and 80° C., in a neutral medium, with the aid of a solvent that is insoluble in water, so as to produce a jelly-like composition known as "NC-Lacquer." The known procedure is carried out at a temperature between 50 and 90° C. The suspension, or the lacquer that is produced, is mechanically stirred, the stirring speed depending on the size and diameter of the reaction vessels, and ranging generally between 50 and 80 r.p.m. After the "NC-Lacquer" has formed, protective colloid is added, followed after a short time by the addition of a water-soluble salt, and then the stirring speed is reduced to about 60 to 80% of the speed used in the production of the lacquer. The lacquer then separates, flowing apart to form particles of different size and shape, which, upon further stirring at this reduced stirring speed, assume a spherical shape. This shaping is ended after about 1½ to 2 hours. The solvent is then evaporated off by increasing the stirring speed and temperature, the evaporation being completed under a vacuum if desired.

In the aforesaid procedure nitrocellulose grains are obtained having a bulk density of 0.8 to 1.1 g./cm.$^3$. For many applications, however, it is advantageous for the nitrocellulose grains to have a lower bulk density. Therefore it has been proposed to again treat with water and ethyl acetate certain screen sizes of a nitrocellulose powder produced by the method described above, the ethyl acetate having to be present in quantities of 50 to 200% of the nitrocellulose powder. The resultant mixture is kept for about four hours at the boiling point of the ethyl acetate and water mixture (about 68° C.), then the ethyl acetate is distilled off.

The disadvantage of this prior-art procedure, which is known as a "density lowering method," is that an additional time-consuming stage of operation is needed, which is followed by removal of the ethyl acetate by distillation, which consumes a large amount of power.

In accordance with the invention it has now been found that nitrocellulose granules having a bulk density of between 0.4 and 0.6 g./cm.$^3$ can be prepared from a nitrocellulose lacquer that is being mechanically stirred under water which has been prepared by working nitrocellulose, stabilizers, and a nitrocellulose solvent insoluble in the water, by the steps of adding to the lacquer a protective colloid and a water-soluble alkali metal or alkaline earth metal salt then reducing the stirring speed whereupon the thickened lacquer breaks up into drop-like particles, further reducing the stirring speed which causes these particles to flow together again, making a second addition of protective colloid and salt, increasing stirring speed to cause the lacquer to again break up and to form the desired particles, and thereafter distilling off the solvent.

The nitrocellulose granules prepared by this method have most surprisingly a bulk density of between 0.4 and 0.6 g./cm.$^3$. The method is distinct from the known process in that nitrocellulose powder characterized by this low density is formed in a single process step, and in which the solvent has to be distilled off only once.

The nitrocellulose granules which are produced by this new process of the invention have different sizes and have the external appearance of spherules. After the solvent has been distilled off and the aqueous layer has been separated, the granules are screened to the various grain sizes without drying. They are then dried in a current of hot air at 60 to 85° C., the drying in no way altering the porous structure of the granules.

By the terminology nitrocellulose lacquer (NC-Lacquer) is meant a highly viscous solution of nitrocellulose and additives having a stabilizing effect, in a solvent for nitrocellulose that is insoluble in water. This NC-Lacquer is prepared by known methods for instance that described above.

Suitable solvents for the nitrocellulose include water-insoluble methyl, ethyl or butyl esters of saturated, aliphatic monocarboxylic acids having 1 to 5 carbon atoms, as for example ethyl acetate or methyl propionate. Any of the other solvents for nitrocellulose can also be used, however, the same must be insoluble in water.

The stabilizing additives are those conventionally used in the manufacture of granular nitrocellulose, such as phthalic acid esters, urethanes, methyl and/or ethyl diphenylureas, diphenylamine or petroleum jelly. Bone glue or gelatins are preferred as protective colloids. Vegetable gums, however, such as gum arabic or ghatti gum, can also be used. The quantity of protective colloid to be added amounts to from 1 to 5% of the weight of the nitrocellulose, and preferably between 3 and 4%.

The alkali metal or alkaline earth metal salt is added preferably in the form of a saturated solution. Anhydrous sodium sulfate is preferred; however, readily water-soluble sulfates, chlorides or nitrates of other alkali or alkaline earth metals are also suitable. The quantity of salt added considerably affects the bulk density. If sodium sulfate is used, an amount of between 20 and 30% of the weight of the nitrocellulose is introduced in the first addition, and between 10 and 20% in the second addition. If other salts are used, the quantities added must be substantially larger in each case.

The salt affects the bulk density in that the more salt is added, the greater the bulk density becomes, up to a certain limit. A total salt addition of more than about half of the nitrocellulose, however, produces no further change in the bulk density of the nitrocellulose granules.

The nitrocellulose lacquer is broken up most rapidly after the addition of protective colloid and salt by adjusting the stirring speed to within a range of between 60 and 90% of the stirring speed at which the NC-Lacquer was prepared. The latter speed, which is known as the original stirring speed, depends on the size of the reaction vessel, its diameter, and the shape of the stirrer. In general, decrease of volume of the reaction vessel necessitates increase of the stirring speed. The correct adjustment of this rotatory speed for forming the lacquer belongs to the state of the art and is known to the artisan. In general, the stirring speed for preparing the lacquer amounts to between 50 and 90 revolutions per minute for reaction vessels of between 80 cm. and 300 cm. of diameter and between 60 and 300 cm. of height.

The breaking up of the lacquer into the desired particles takes place slowly. The stirring may not be interrupted nor may the stirring speed be varied appreciably, because otherwise, particularly at the onset of particle formation, the lacquer flows back together again. The formation of the granules from the individual lacquer particles is completed after about 1½ hours. The finished granules are not further modified in shape by varying the speed of rotation or the temperature.

The solvent is distilled off after the granule formation has been completed. Towards the end of the distillation it is advantageous to distill under a vacuum.

It is also possible for the process of the invention to be followed by the prior-art process for reducing the density, i.e., the above-named "density lowering process," without thereby losing the properties which the nitrocellulose granules have had imparted to them, so that in this manner nitrocellulose grains having a still lower bulk density can be obtained. If in this possible further "density lowering process" a solution of glycerine trinitrate and/or glycol dinitrate in ethyl acetate is used, polybasic nitrocellulose powders can be obtained. The procedure in this case comprises adding, under water, to the nitrocellulose granules prepared by the process of the invention, after the solvent has been distilled off, a solution of about 30% glycol dinitrate in ethyl acetate, and a solution of about 1% diethyldiphenylurea in ethyl acetate, at a temperature of 55° C., the desired ratio of nitrocellulose grains to glycerine trinitrate amounting to 2:1, and the ratio of the nitrocellulose grains to the diethyldiphenylurea amounting to 2:0.035. This is followed by 6 hours of stirring.

If the nitrocellulose granules are not subjected to an additional dissolving process (e.g., the density lowering process or the preparation of dibasic powders), they are filtered, screened while still moist, and the individual grades are dried.

The following examples are given for the purpose of illustrating the invention and are not to be construed as in any way limiting the scope thereof.

Example 1

A vessel having a capacity of five cubic meters and a diameter of 1.8 m., and which was provided with an anchor stirrer and baffle plates was charged with 300 kg. of nitrocellulose, 2.5 kg. of diphenylamino, 2.4 kg. of $CaCO_3$ and 2080 liters of water. Then, at a stirring speed of 65 r.p.m., 960 l. of ethyl acetate were added, and the resulting solution heated to a temperature of 68° C. After a reaction time of 2 hours, a warm solution of 10 kg. of pearl glue in 180 l. of water was added, and the stirring speed reduced to 30 r.p.m. The lacquer which had been formed at first immediately broke up into fragments, but then flowed back together and remained a viscous mass. After 15 minutes a warm solution of 70 kg. $Na_2SO_4$ in 270 l. of water was added, while the temperature was maintained at 68° C. and the stirring speed adjusted to 30 r.p.m.

After 60 minutes had elapsed the stirring speed was doubled to 60 r.p.m., and 2 kg. of dry pearl glue and a solution of 40 kg. $Na_2SO_4$ in 180 liters of water were successively added. The lacquer immediately broke up again into fragments which became increasingly smaller. After about 1½ hours of stirring time the particles had the desired grain size. The stirring speed was then decreased to 40 r.p.m., and the ethyl acetate distilled off over a period of 3.5 hours with slow elevation of the temperature to 90° C., finally with the application of a vacuum of 350 mm. mercury column. After the completion of the distillation, the powder which remained was cooled to 55° C. by addition of large quantities of water, and the batch poured out of the reaction vessel and filtered.

The final drying of the grains was carried out with hot air at 65 to 75° C. in a hurdle drying oven. The bulk density of the grains amounted to 0.45 g./cm.$^3$, and the yield of grains ranging between ASTM sieves 32 and 48 (0.3 to 0.5 mm.) amounted to 71%.

Example 2

The same quantity ratios as set out in Example 1, were used and the same procedure followed, excepting that the stirring speeds were varied: the nitrocellulose lacquer, for example, was prepared as in Example 1 at 65 r.p.m. The first addition of glue was conducted at 40 r.p.m. Before the first addition of salt (5 minutes after the completion of the addition of glue), the stirring speed was reduced to 20 r.p.m.; at this speed stirring was continued for about one hour, and then the speed was increased to 40 r.p.m., and glue and salt were added as set out in Example 1. The remainder of the process was carried out as disclosed in Example 1. The bulk density of the grains thereby obtained amounted to 0.58 g./l.; the yield of grains having sizes of between ASTM sieves 32 and 48 was 85%.

What is claimed is:

1. Process for the manufacture of nitrocellulose granules having a bulk density of 0.4 to 0.6 g./cm.$^3$ which comprises preparing a nitrocelluose lacquer by stirring under water nitrocellulose, a stabilizer, and a solvent for nitrocellulose which is insoluble in water, continuing to stir the lacquer at a speed of about 50 to 90 r.p.m., adding a protective colloid and a water-soluble alkali metal or alkaline earth metal salt, reducing the stirring speed whereby the lacquer breaks up into drop-like particles, reducing the stirring speed still further to cause the particles to flow back together, adding further amounts of said protective colloid and water-soluble alkali metal or alkaline earth metal salt and increasing the stirring speed to a speed amounting to 60 to 95% of the original stirring speed whereby the lacquer is caused to break up into drop-like particles, evaporating off the solvent and recovering the nitrocellulose granules.

2. Process according to claim 1 wherein said solvent is a methyl, ethyl or butyl ester of a saturated aliphatic monocarboxylic acid having 1 to 5 carbon atoms.

3. Process according to claim 2 wherein said solvent is a member selected from the group consisting of ethyl acetate and methyl proprionate.

4. Process according to claim 1 wherein said stabilizer is a member selected from the group consisting of phthalic acid esters urethanes, methyl diphenylurea, ethyl diphenylurea, diphenylamine and petroleum jelly.

5. Process according to claim 1 wherein said colloid is a member selected from the group consisting of bone glue, gelatin and vegetable gums.

6. Process according to claim 5 wherein said colloid is used in an amount of 1 to 5% by weight of the nitrocellulose.

7. Process according to claim 1, wherein said salt is added in the form of its saturated solution.

8. Process according to claim 1 wherein said salt is a member selected from the group consisting of alkali metal and alkaline earth metal sulfates, chlorides and nitrates.

9. Process according to claim 1 wherein said salt is $Na_2SO_4$.

10. Process according to claim 9 which comprises introducing said $Na_2SO_4$ in said first addition in an amount of from 20 to 30% by weight of the nitrocellulose and in said second addition in an amount of from 10 to 20% by weight of the nitrocellulose.

11. Process according to claim 1 wherein said stabilizer is diphenylamine, said salt is $Na_2SO_4$ and said solvent is ethyl acetate.

12. In a process for the manufacture of nitrocellulose granules comprising:
(a) preparing a nitrocellulose lacquer by stirring at a relatively high r.p.m., under water, nitrocellulose, and a solvent for nitrocellulose which is insoluble in water to form in the water a nitrocellulose lacquer,
(b) reducing the stirring speed so that the lacquer breaks up into drop-like particles,
(c) evaporating the solvent to form nitrocellulose granules in the water, the improvement for production of granules having a bulk density of 0.4 to 0.6 g./cm.³ which comprises:
(d) following step (b) reducing the stirring speed still further to cause the particles to flow back together again,
(e) following step (d), increasing the stirring speed to cause the lacquer to again break up into droplike particles, and
(f) following step (e), performing step (c).

13. Process according to claim 12, before step (b) adding protective colloid and water-soluble alkali metal or alkaline earth metal salt; after step (d) and before step (e) adding a protective colloid and water-soluble alkali metal or alkaline earth metal salt.

14. Process according to claim 13, the increased stirring speed being 60 to 95% of the stirring speed used in step (a).

References Cited
UNITED STATES PATENTS

| | | | |
|---|---|---|---|
| 2,919,181 | 12/1959 | Reinhardt | 260—223 |
| 2,722,528 | 11/1955 | Johnson | 260—223 |
| 2,292,469 | 8/1942 | Olsen | 260—223 |

THEODORE MORRIS, Primary Examiner

U.S. Cl. X.R.

106—170, 185, 195, 198; 260—223